United States Patent [19]

Van Arnam

[11] 4,243,618
[45] Jan. 6, 1981

[54] METHOD FOR FORMING RETROREFLECTIVE SHEETING

[75] Inventor: Donald E. Van Arnam, Ontario, Calif.

[73] Assignee: Avery International Corporation, San Marino, Calif.

[21] Appl. No.: 953,555

[22] Filed: Oct. 23, 1978

[51] Int. Cl.² ................... B29D 11/00; B29C 1/02
[52] U.S. Cl. .............................. 264/1; 29/411; 29/425; 29/445; 76/107 R; 264/220; 264/225
[58] Field of Search ................ 264/1, 2, 219, 220, 264/225; 350/103, 104, 105; 425/808; 29/411, 425, 445, 557; 76/107 R

[56] References Cited

U.S. PATENT DOCUMENTS

| | | | |
|---|---|---|---|
| 2,205,638 | 6/1940 | Stimson . | |
| 2,623,336 | 12/1952 | Onksen, Jr. | 76/107 R |
| 2,875,543 | 3/1959 | Sylvester et al. | 264/1 |
| 2,915,935 | 12/1959 | Pabst et al. | 76/107 R |
| 3,541,606 | 11/1970 | Heenan et al. | 350/103 |
| 3,684,348 | 8/1972 | Rowland | 264/1 |
| 3,712,706 | 1/1973 | Stamm | 350/103 |
| 3,739,455 | 6/1973 | Alvarez | 264/1 |
| 3,810,804 | 5/1974 | Rowland | 156/245 |
| 3,873,184 | 3/1975 | Heenan | 350/103 |
| 3,924,929 | 12/1975 | Holmen | 350/103 |
| 4,025,159 | 5/1977 | McGrath | 156/272 |
| 4,066,331 | 1/1978 | Lindner | 350/103 |
| 4,080,280 | 3/1978 | Heasley | 350/103 |

FOREIGN PATENT DOCUMENTS 398647 9/1933 United Kingdom .

*Primary Examiner*—James B. Lowe
*Attorney, Agent, or Firm*—Christie, Parker & Hale

[57] ABSTRACT

A method is disclosed for forming a retroreflective sheeting having a plurality of retroreflective cube-corner prisms distributed over one of its surfaces such that the prisms are disposed in a planar array having a plurality of zones of prisms having differing angular orientations such that the zones have differing retroreflective brightness when illuminated by a light beam at a high angle of incidence. The method comprises clamping a plurality of pins together such that the ends of the pins form a substantially planar surface, inscribing the planar surface for forming thereon a continuous pattern of solid trigonal pyramids with internal dihedral angles of 90 degrees, releasing the bundle of pins and rotating the individual pins for changing the angular orientation of the formed trigonal pyramids on adjacent pins, reclamping the pins together and using the inscribed surface of the bundle of pins for forming a mold containing cube-corner prism cavities, and producing prismatic retroreflective sheeting by embossing, molding or casting in such mold.

18 Claims, 10 Drawing Figures

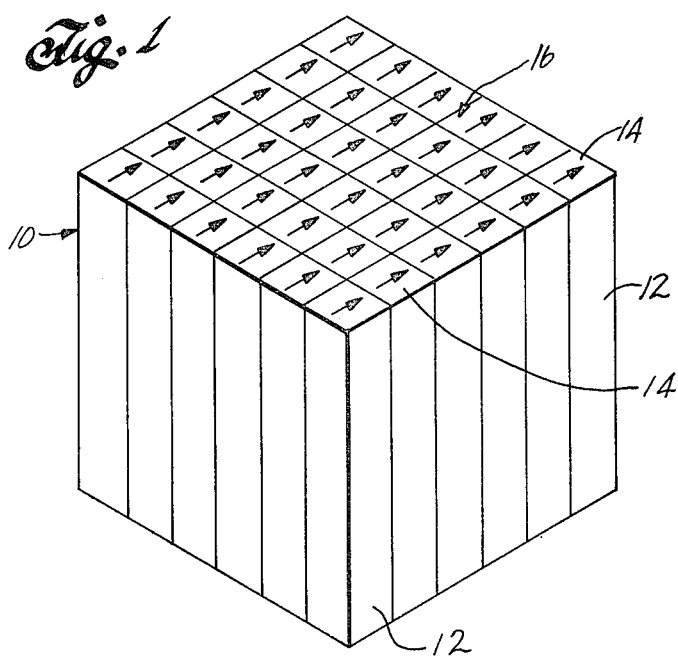
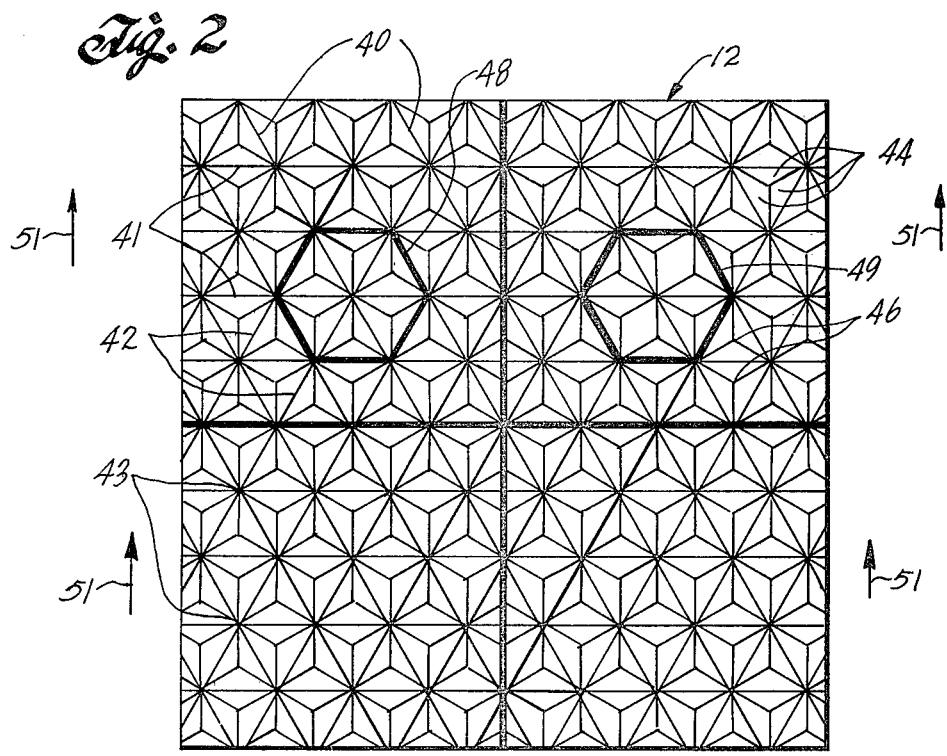

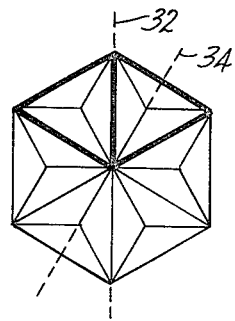
Fig. 9A
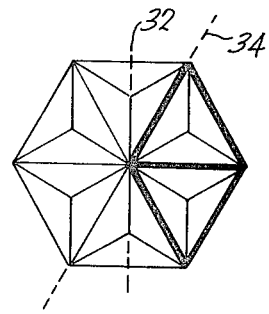
Fig. 9B
Fig. 10
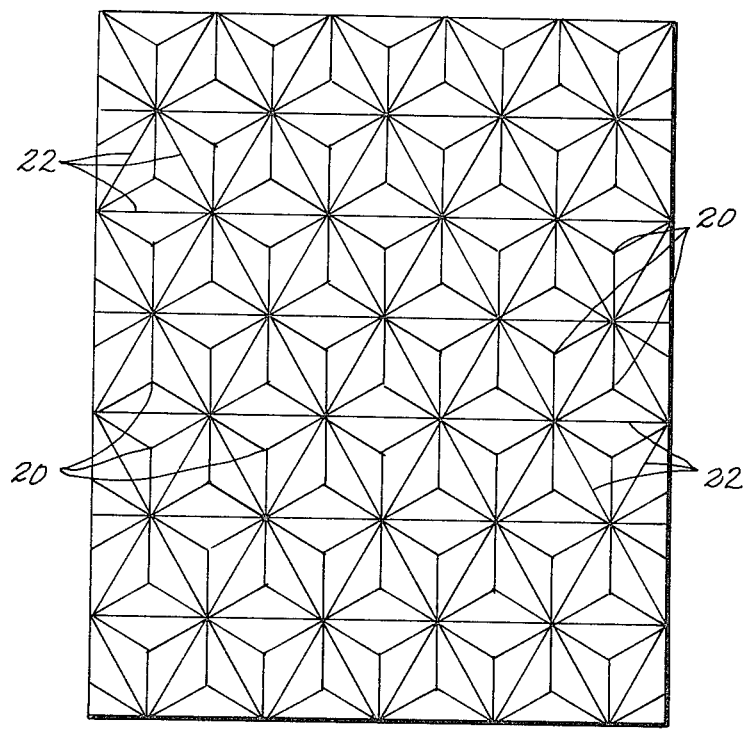

४,२४३,६१८

METHOD FOR FORMING RETROREFLECTIVE SHEETING

CROSS-REFERENCE TO RELATED APPLICATION

This application is related to U.S. patent application Ser. No. 899,311, entitled DICED RETROREFLECTIVE SHEETING, filed on Apr. 24, 1978 and assigned to the same assignee as this application.

BACKGROUND FOR THE INVENTION

The present invention relates to making cube-corner retroreflective sheeting, particularly to a method for making cellular retroreflective sheeting for use in the preparation of road markers and signs.

Cube-corner retroreflective sheeting and methods for making such sheeting have been described in a number of patents. U.S. Pat. No. 3,684,348 to Rowland describes retroreflective sheeting in which a multiplicity of separately formed, minute cube-corner formations having a side edge dimension of less than 0.025 inch are formed by molding the cube-corner formations onto a plastic film that serves as the base for the retroreflective sheeting. U.S. Pat. No. 3,810,804 to Rowland describes a method for making such retroreflective sheeting by depositing on a molding surface having cube-corner recesses a fluid molding material in an amount to fill the recesses. A preformed body member such as a plastic film is applied to the fluid-filled mold and the molding material is hardened and bonded to the body member. The above-mentioned Rowland patents are incorporated herein by this reference.

U.S. Pat. No. 2,205,638 to Stimson describes a retroreflective reflecting device using cube-corner cavities to bring about reflection. The reflecting device of Stimson uses at least two groups of cube-corner cavities with the groups rotated at least 180 degress in relation to each other. By rotating the two groups in such a manner, a greater angle of reflectivity is provided. The groups of cube-corner cavities is provided by cutting or dividing the surface upon which the cube-corner cavities had been formed and then rotating the divided elements to provide the necessary orientation of 180 degree rotation.

U.S. Pat. No. 3,924,929 to Holmen et al also discloses cellular cube-corner retroreflecting sheet material. Each cell of the cube-corner retroreflecting sheet material is polygonal and contains at least three cube-corner retroreflecting units. The cells are separated by septa which define the cells. The retroreflecting sheet material can be cut into segments, then rejoined to form the necessary orientation of the cells when the retroreflecting sheet material is being utilized such as in sign making.

U.S. Pat. 3,712,706 to Stamm, which is incorporated herein by this reference, explains in excellent detail both the theory behind the retroreflective behavior of such cube-corner sheeting and methods for forming such sheeting. Briefly, a carefully polished flat blank is ruled with a series of parallel closely spaced grooves using a diamond tool having a point shaped to a precise angle. A second set of parallel grooves is ruled at an angle of 120 degrees to the first set, and a third set of grooves is ruled at an angle of 120 degrees to each of the first two sets to produce minute cube-corner prisms having equilateral triangular bases and arranged in an array having hexagonal symmetry. The ruled master is used to form a mold having an array of cube-corner recesses. The mold is then used for casting or embossing a series of minute cube-corner prisms onto a transparent base sheet. Light entering the base sheet through the side opposite the prisms is reflected within the prisms and directed back through the base sheet toward the source of light.

The intensity of the retroreflected beam from such sheeting is greatest when the incident beam has an angle of incidence of zero degrees, i.e., is normal to the plane of the reflective sheeting. At higher angles of incidence, e.g., at angles greater than about 30 degrees from the normal, the brightness of the retroreflected beam is a function of the angle about an axis normal to the sheeting, called the azimuthal angle, at which the incident beam strikes the sheeting. When the angle of incidence of a light beam is held constant at a value of, for example, 30 degrees from the normal and the azimuthal angle of the incident beam is varied from zero to 360 degrees, the intensity of the retroreflected beam varies. Rotation of such an array about an axis normal to the array through an angle of 30 degrees produces the maximum difference in orientation of the prisms, whereas rotation through an angle of 60 degrees, or any multiple thereof, produces no difference in effective orientation. A graph of the intensity on polar coordinates shows six maxima and six minima at 30 degrees azimuthal intervals.

High retroreflectivity at high angles of incidence is an important characteristic for road signs. When a single large sheet of cube-corner retroreflective material is to be used, for example, as the background of a sign, it is a relatively simple matter for the manufacturer of the sheeting to include on the sheet an indication of the proper orientation of the sheet for achieving maximum retroreflectivity at high angles of incidence in a plane roughly parallel to the ground. However, it is customary in sign making practice to cut up the retroreflective sheeting for making letters and other indicia and for piecing together large backgrounds. Regardless of the orientation of individual pieces of sheeting used to make up the sign, at low angles of incidence the sign will appear uniformly bright. However, at high angles of incidence, i.e., 300 degrees, some portions of the sign may be oriented to provide a retroreflected beam of higher intensity, and other portions of the sign may be oriented to provide a retroreflected beam of lower intensity. Such a sign would appear to an observer to have an uneven brightness which would at least be unattractive and which could be severe enough to obscure the indicia on the sign.

Thus, great care must be taken to maintain the orientation of the prisms on such retroreflective sheeting when pieces of the sheeting are used to make up signs. Because the individual prisms are so small, it can be difficult or impossible to maintain the orientation of the sheeting by visual inspection, and the utility of such sheeting to sign makers is diminished.

The retroreflective efficiency of the sheeting diminishes when the reflecting faces of the prisms become dirty or weathered. Cellular retroreflective sheeting has been described in which a cover sheet is supported in spaced relation to the prisms on a network of narrow intersecting ridges or septa. The cover sheet is sealed to the ridges, thereby providing a plurality of sealed cells, each cell containing a plurality of prisms which are protected within the cell from dirt and weathering. U.S. Pat. No. 4,025,159, which is incorporated herein by this reference, describes cellular retroreflective sheeting and methods for sealing the cover sheet to the network of ridges. For reasons of mechanical strength, simplicity and reflective efficiency, the cells are generally formed as close-packed, regular polygons, notably squares as illustrated in said U.S. Pat. No. 4,025,159. Retroreflective sheeting having such square cells can be oriented visually in either of two perpendicular directions by aligning the sides of the squares. Because the prisms are in an array having hexagonal symmetry, rotation of the entire array by 90 degrees, as could occur in the piecing together of a sign, can result in an effective angular displacement of 30 degrees in the orientation of the prisms on one piece of sheeting with respect to the prisms on another piece of sheeting. Inasmuch as maxima and minima in retroreflective brightness occurs at 30 degree intervals, such misorientation would result in some portions of the sign having maximum retroreflective efficiency in a horizontal plane and other portions of the sign having minimum retroreflective efficiency in the horizontal plane.

It would be desirable, therefore, to have a method for making cube-corner retroreflective sheeting which could be cut up and pieced together to form a sign without regard for the orientation of the individual pieces.

SUMMARY OF THE INVENTION

The present invention provides a method for forming retroreflective sheeting having a plurality of retroreflective cube-corner prisms distributed over one of its surfaces such that the prisms are disposed in planar array having a plurality of zones of prisms having differing angular orientations such that the zones have differing retroreflective brightness when illuminated by a light beam at a high angle of incidence. The method comprises clamping a plurality of pins together such that the ends of the pins form a substantially planar surface, inscribing the planar surface for forming thereon a continuous pattern of trigonal pyramids having internal dihedral angles of 90 degrees covering the inscribed surface. The bundle of pins is loosened and the individual pins are rotated for changing the angular orientation of the formed trigonal pyramids on adjacent pins. The pins are reclamped together forming a mold consisting of cube-corner prism cavities. The mold can be embossed, molded or cast to form a prismatic retroreflective sheeting having a plurality of retroreflective cube-corner prisms distributed over its surface.

The mold formed can be inscribed forming a grid of grooves on the surface of the mold which grid lines correspond with the pin edges. Upon embossing, molding or casting, the prismatic retroreflector sheeting against the mold, the grid provides a network of narrow intersecting ridges or septa. A cover sheet can be sealed to these septa thereby providing a plurality of sealed cells, each cell containing a plurality of prisms which are protected within the cell from dirt and weathering.

The method can be utilized to inscribe pins of any cross-sectional configuration such as pins having cross-sectional configurations of squares, parallelograms, triangles, hexagons and the like. By providing pins of differing cross-sectional configuration a different orientation of the prisms can be provided upon rotation of the pins.

The method of this invention also comprises inscribing separate bundles of pins with cube-corner pyramids having differing internal dihedral angles. The bundles are then loosened and the pins from the separate bundles are intermixed for providing new bundles of pins having a mixture of cube-corner pyramids.

BRIEF DESCRIPTION OF THE DRAWINGS

FIG. 1 illustrates a bundle of pins having been inscribed and schematically illustrates the angular orientation of the trigonal pyramids formed on a planar surface of the bundle of pins;

FIG. 2 is a top view of four of the pins from FIG. 1 schematically illustrating the angular orientation of the trigonal pyramids;

FIGS. 9A and 9B illustrate two hexagonal arrays of cube-corner prisms having orientations differing by an azimuthal angle of 30 degrees and how such differing orientations can be achieved by rotating the entire array through 90 degrees; and FIG. 10 illustrates retroreflective sheeting of triangular cube-corner prisms in a planar array having hexagonal symmetry.

DETAILED DESCRIPTION OF THE INVENTION

Figure 8:
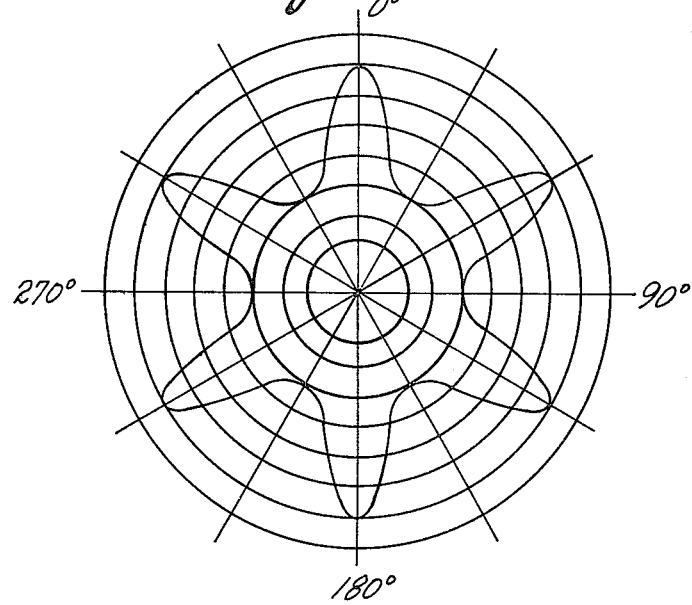
FIG. 8 is a graph in polar coordinates suggesting in exaggerated degree how the intensity of a retroreflected beam at high angles of incidence varies with the azimuthal angle of the beam for an array of cube-corner prisms having hexagonal symmetry.

Referring to FIG. 10, a section of retroreflective sheeting having an array of triangular based cube-corner prisms is shown from the non-retroreflecting prism side. The array has six sets of parallel planes of symmetry normal to the plane of the array. Three sets of planes of symmetry pass through the apices 20 of the prisms, and three planes of symmetry through the valleys 22 between prisms which correspond to ruled grooves on the engraved master. The projections on the plane of the array of two such planes of symmetry are indicated by dashed lines 32 and 34 in FIGS. 9A and 9B. An incident beam of light striking the array at a high angle of incidence, such as an angle of greater than 30 degrees from the base side (i.e., from behind the plane of FIG. 1), is retroreflected with an intensity that is related to the relative positions of the incident beam and the planes of symmetry of the array. FIG. 8 is an exaggerated plot on polar coordinates of the intensity of the retroreflected beam from such sheeting as a function of the azimuthal angle of the incident beam at a high angle of incidence. The maxima are spaced from the minima by 90 degrees. It is readily apparent that a sign maker piecing together a sign from pieces of such sheeting could place the material on the sign substrate in a variety of orientations, because the prisms are so small that there is no visual indication of the orientation of the prism arrays. For example, a sign made from retroreflective sheeting having cube-corner prisms in but one orientation would appear light and dark as the azimuthal angle varies. Cellular sheeting having square cells could be oriented with equal probability in either of two perpendicular directions corresponding to alignment of the cell edges and, as a result, some pieces of sheeting would appear brighter and some darker to an observer viewing the sheeting at a high angle of incidence. FIGS. 9A and 9B depict two hexagonal arrays of prisms which are oriented with respect to one another in such a way that corresponding planes of symmetry, such as planes indicated by dashed lines 32 and 34 intersect at an angle of 30 degrees. The prism pairs within the bold outlines show that an angular displacement of 30 degrees in the orientation of the planes of symmetry can be achieved by rotating the entire array to an angle of 90 degrees, as would naturally occur if pieces of sheeting having square cells were assembled with care taken only to align the sides of the cells.

Retroreflective sheeting made by the method herein overcomes the inherent problems of misorientation in the making of signs or indicia using cube-corner, prismatic retroreflective sheeting.

In accordance with this invention, a retroreflective sheeting is made which has a plurality of small zones or regions of cube-corner prisms of differing orientation distributed in a systematic or random pattern across the sheet. The zones or regions are small enough so that at the minimum expected viewing distance of the sheeting, which may be several hundred feet in the case of a highway sign, the individual zones are not resolvable by the unaided human eye. Each zone contains triangular cube-corner prisms in an array having hexagonal symmetry as illustrated in FIG. 10. The arrays in a portion of the zones are angularly displaced or rotated with respect to the arrays in another portion of the zone in such a way as to reduce the variation in retroreflective efficiency of the sheet as a whole as a function of the azimuthal angle of the incident beam. Although at a given azimuthal angle, some of the zones or regions appear darker and some lighter, the eye perceives only the average brightness of the sheet because the zones are too small to be individually resolvable at the minimum expected viewing distance.

The method comprises arranging a plurality of pins into a bundle. The pins are clamped together in such a manner that the longitudinal axis of each pin is parallel to the longitudinal axis of every other pin in the bundle. The top surfaces of the pins provide a substantially planar surface for the bundle of pins. The pins can have a lateral cross-sectional area configuration such as a square, rectangle, parallelogram, triangle, hexagon and the like. The pins can be of any desired size depending upon the end use of the retroreflective sheeting to be produced. For example, it is preferred that the pins be about 0.1 to about 0.25 inch at their widest dimension when the end use of the retroreflective sheeting is to be highway signs. Pins having such a dimension are sufficiently small to prevent a visual checkerboard appearance when viewed under nighttime reflective conditions. Pins having a dimension larger than 0.25 inch results in a distinct dark and light pattern when viewed at night. The length of the pins is not critical and can be any suitable length depending upon the means for clamping the bundle together or use of the bundle in forming a mold. FIG. 1 illustrates a bundle of pins formed from a plurality of pins, each pin having a generally square cross-sectional configuration. In FIG. 1 individual pins 12 are clamped together along their longitudinal axis. The top surfaces 14 of the individual pins in combination form a planar surface 16 for the bundle 10. The pins are tightly held together to prevent slipping of the pins and distortion of the planar surface 16.

The pins can be constructed of any sufficiently hard material that provides sufficient strength for a mold to be made therefrom. The material used in constructing the pins should also be sufficiently soft so as to provide a surface which can be inscribed or etched to form the necessary pattern thereupon. Suitable material for the construction of the pins include: copper, brass, aluminum, hard plastic, hard rubber and the like.

After the pins have been clamped together, the planar surface 16 formed by the top surfaces of the pins is inscribed or etched to form cube-corner pyramids, i.e., trigonal pyramids upon such surface 16. One method for forming trigonal pyramids upon a surface is disclosed in U.S. Pat. No. 3,712,706 to Stamm, which is incorporated herein by this reference. As disclosed in U.S. Pat. No. 3,712,706, closely spaced triangular based cube-corner prisms in an ordered array having uniform orientation can be formed by inscribing three series of parallel equidistant intersecting grooves such that the point of intersection is crossed by one groove from each of the three sets. With reference to FIG. 2, the three sets of parallel lines are represented by lines 40, 41 and 42. By ruling three sets of grooves in this manner, the entire surface is filled with trigonal pyramids and the bottoms of the grooves generally occupy essentially zero area if the tool used for inscribing is sharp. There are primarily three methods by which the faces of the pyramids formed can be made to be optically flat. These methods include:

1. direct ruling with a V-shaped diamond tool, with the two edges of the cutting face ground and polished on a diamond-charged lap;

2. by roughing out the three sets of grooves on the planar surface initially with a diamond or carbide tool followed by lapping in three directions with soft metal laps containing only one set of grooves and charged with diamond dust as an abrasive; and 3. creating all three sets of grooves by lapping alone.

FIG. 2 illustrates the surface of four adjacent pins which have been ruled and inscribed with the three series of parallel equidistant and intersecting lines 40, 41 and 42. The lines are ruled on the surface such that the lines intersect at common points 43 with one line from each of the three sets. At this common point 43 of intersection of the lines, each line forms an angle of 60 degrees from each other line. The engraving tool as described in U.S. Pat. No. 3,712,706 is constructed such that the inscribed groove forms a trigonal pyramid which has faces 44 positioned at right angles each to one another. The trigonal pyramids so formed is a cube-corner pyramid. The faces 44 of the trigonal pyramid formed are isosceles, equal area triangles.

As is shown in FIG. 2 each individual pin 12 has a plurality of trigonal pyramids formed upon its top surface. Preferably, the rulings made for forming the pyramids are made in such a manner that the pyramids have a size of about 0.003 to about 0.015 inch along the side of the base of the pyramids. The array of cube-corner pyramids shown in FIG. 2 and formed by inscribing the surface formed by the heads of the pins, has six sets of parallel planes of symmetry normal to the plane of the array. Three sets of planes of symmetry pass through the apices 46 of the prisms and three planes of symmetry pass through the valleys between prisms which correspond to the ruled lines 41, 42 and 43. The pattern illustrated in FIG. 2 corresponds to the pattern of the retroreflective sheeting illustrated in FIG. 10. The retroreflective sheeting illustrated in FIG. 10 is a replicate of the incised pattern on the planar surface 16 of the bundle of pins 10. A replicate can be formed from a mold made from the bundle of pins 10. Such a replicate would be a retroreflective sheeting having a plurality of retroreflective cube-corner prisms distributed over its surface. The cube-corner prisms of FIG. 10 would coincide with the trigonal pyramids illustrated in FIG. 2. Similarly, the array of cube-corner prisms would also have six sets of parallel planes of symmetry normal to the plane of the array. Three sets of planes of symmetry pass through the apices of the prisms and three planes of symmetry pass through the valleys between prisms which correspond to the ruled grooves on the pins. The projections on the plane of the array of two such planes of symmetry are indicated by dashed lines 32 and 34 in FIGS. 9A and 9B. An incident beam of light striking the array at a high angle of incidence, such as an angle of 30 or 40 degrees, from the base side (i.e., from behind the plane of FIG. 10), is retroreflected with an intensity that is related to the relative positions of the incidence beam and the planes of symmetry of the array.

In FIG. 2 there is depicted, within bold outlines, two hexagonal arrays 48 and 49 of prisms on adjacent pins 12. The prism pairs, within the hexagonal arrays 48 and 49 of the two adjacent pins, show that the orientation of the planes of symmetry are identical for the array of cube-corner prisms. Therefore, the angular orientation of all the cube-corner prisms formed by inscribing the planar surface 16, formed by the top surfaces of the pins, is the same.

The bundle of pins 10 is loosened so as to enable the individual pins 12 to be movable. The individual pins are then rotated to provide an orientation of the pyramids on one pin which differs from the orientation of the pyramids on adjacent pins. A 30 degree rotation is all that is required in order to provide a different orientation and thereby provide a different intensity of reflected light. As shown in FIG. 8, no effect will be realized if the pins are rotated 60 degrees, or multiples of 60 degrees. For this reason, rotating the pins 90 degrees results in a net overall rotation of thirty degrees which is sufficient to provide a different orientation of the reflective capabilities of the prisms. In FIG. 1 the arrows drawn upon the top surfaces of the pins represent an angular orientation of the trigonal pyramids inscribed upon the planar surface 16 of the bundle of pins.

Figure 4:
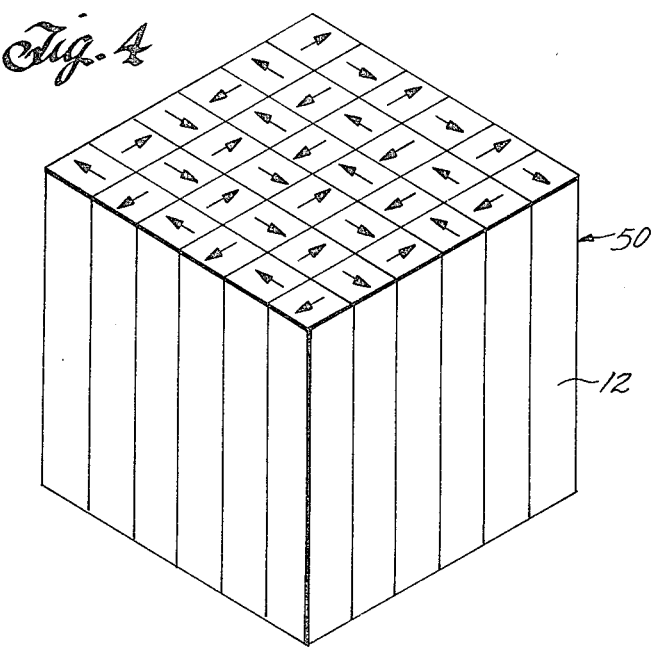
FIG. 4 schematically illustrates the bundle of pins shown in FIG. 1, wherein the pins have been rotated to disorient the angular orientation of the trigonal pyramids on the heads of the pins.

After individually rotating the pins, they are clamped firmly back together forming a new bundle of pins. FIG. 4 schematically represents the entire bundle 50 of pins 12 which have been rotated 90 degrees from each other. The arrows drawn on the top surfaces of the pins schematically illustrate a possible differing orientation of the prisms inscribed on the top surface of the pins.

Figure 3:
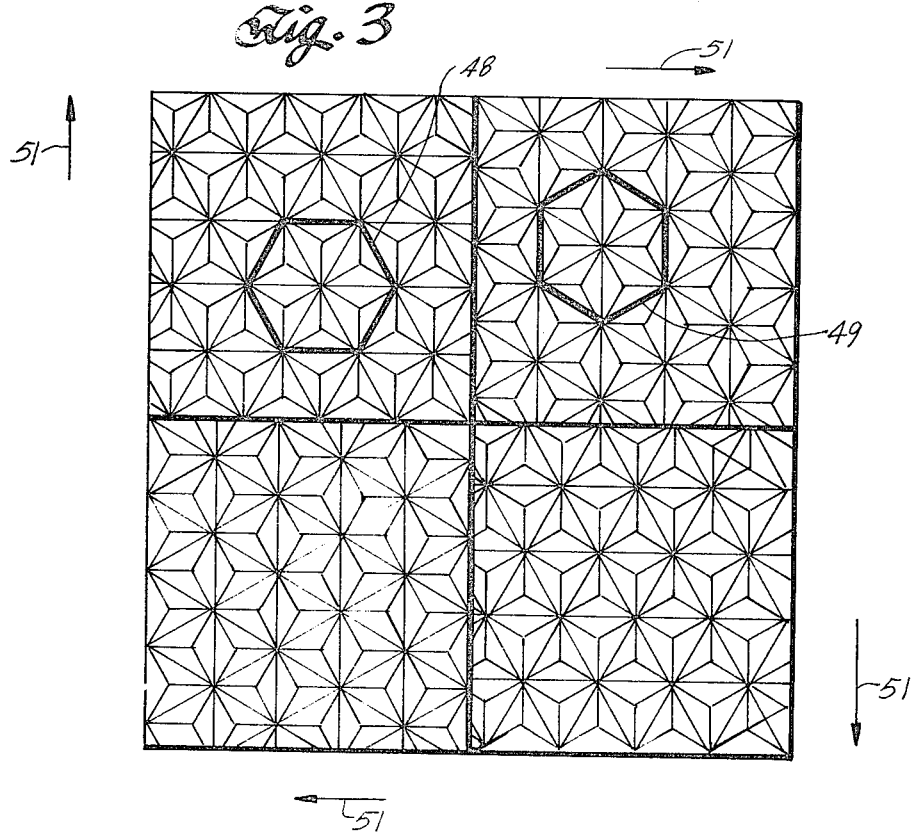
FIG. 3 is a top view of the four pins of FIG. 2 and schematically illustrates the angular orientation of the trigonal pyramids when the individual pins have been rotated by 90 degrees.

FIG. 3 illustrates a top view of the four pins of FIG. 2 wherein three of the pins have been rotated at least 90 degrees from each adjacent pin to provide a different orientation for the prisms on the respective pins. As in FIG. 2, the same two hexagonal arrays 48 and 49 of prisms on adjacent pins are set forth within bold outlines in FIG. 3. The pin on which the hexagonal array 49 is found has been rotated 90 degrees from the pin on which the hexagonal array 48 is found. As is shown in FIG. 3, there has been an effective displacement of the pyramids within hexagonal array 49 of 30 degrees from the pyramids within hexagonal array 48. The arrows 51 drawn along the side of the individual pins in FIGS. 2 and 3 schematically illustrate how the identical angular orientation of the prisms on each pin in FIG. 2 has been affected by rotating the pins. As stated above, an angular rotation of 60 degrees, or multiple of 60 degrees, would theoretically have no effect on the reflective properties of the prisms. However, due to the directional scoring when inscribing the planar surface 16, a rotation of a pin 180 degrees from an adjacent pin can have some effect and thereby provide differing light reflective properties of the prisms on the pins. After rotating each pin, the angular orientation of the cube-corner prisms on each adjacent pin is sufficiently distinct that retroreflective prismatic sheeting replicated from such pins provides a variety of retroreflective properties relatively independent of the azimuthal angle of incident light.

Figure 5:
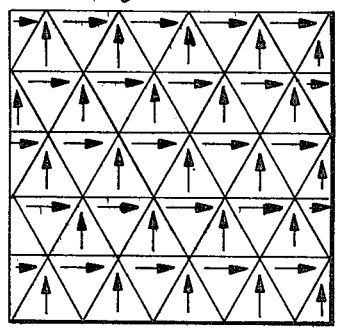
FIG. 5 schematically illustrates a top view of a bundle of pins each having a triangular cross-sectional configuration and which pins have been rotated for providing disorientation of the trigonal pyramids formed upon the heads of the pins.
Figure 6:
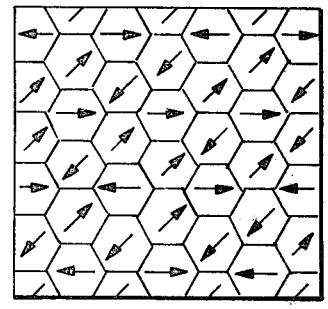
FIG. 6 schematically illustrates a top view of a bundle of pins each pin having a hexagonal cross-sectional configuration and which pins have been rotated for providing disorientation of the trigonal pyramids formed upon the heads of the pins.

FIGS. 5 and 6 each illustrate a top view of a planar surface of a bundle of pins wherein the respective pins have a cross-sectional area corresponding to a triangle or hexagon. FIGS. 5 and 6 schematically show how triangular and hexagonal pins can be rotated to provide the necessary disorientation of the prisms formed upon the top surface of the pins.

After the pins have been rebundled, they can be used to form a mold for making retroreflective, prismatic sheeting by any technique, many of which are known in the art. A plurality of molds can be made from the bundle of pins. The molds so made can thereafter be fastened together for forming retroreflective sheeting of a size larger than an individual mold or individual bundle of pins. As contiguous molds can be formed using multiple impressions of one bundle of pins, so also contiguous molds can be made using a plurality of bundles of pins. When a plurality of bundles are used, the orientation of the pyramids on each of the bundles is different due to the random rotation of the individual pins of each bundle. Each such bundle of pins, therefore, has a different pyramidal surface. Another method of providing different bundles of pins having differing pyramidal surfaces is by inscribing each bundle of pins to form differing pyramids on their surfaces. For example, one bundle of pins can have inscribed on its surface an array of trigonal pyramids having the base of such trigonal pyramids about 0.005 inch long on a side. Another bundle of pins could have an array of trigonal pyramids formed on its surface which trigonal pyramids have triangular bases of sides about 0.010 inch in length. By mixing the bundles of pins and forming a mold consisting of contiguous impressions of such differing bundles of pins, a retroreflective sheeting can be produced having differing retroreflective properties.

As differing bundles of pins can be used for forming molds for the production of retroreflective sheeting, so also can the pins from differing bundles of pins be interchanged for providing a differing prismatic and retroreflective effect. For example, if the pins have a cross-sectional area which is a right angle isosceles triangle in configuration, two of such pins placed hypotenuse to hypotenuse will provide a square rectangular cross-sectional area. If the cross-sectional area of one of the triangular shaped pins is one-half the cross-sectional area of a pin having a square cross-sectional area, then two such triangular cross section pins can be substituted for such a square pin in a bundle of such square cross-sectional area pins. In like manner, other pins from other bundles of pins can be interchanged among bundles of pins for providing differing prism orientation on the surface of a completed bundle of pins.

When the pins used have a general triangular cross-sectional configuration, a different configuration of the pyramids formed upon the head of the pin can be obtained by rotating the pins as illustrated in FIG. 5 or by intermixing pins from separate rulings.

If the pins have a general hexagonal cross-sectional configuration, then prisms can be inscribed upon the surface of such pins by making three rulings, wherein the ruling axis would be rotated from its zero direction to 20 degrees for the second ruling, and 40 degrees for the third ruling. Pins from such three rulings would then be assembled into a bundle as illustrated in FIG. 6. Again, one-half of each of the three rulings of pins could be rotated 180 degrees to compensate for any inaccuracies inherent in the ruling process.

Figure 7:
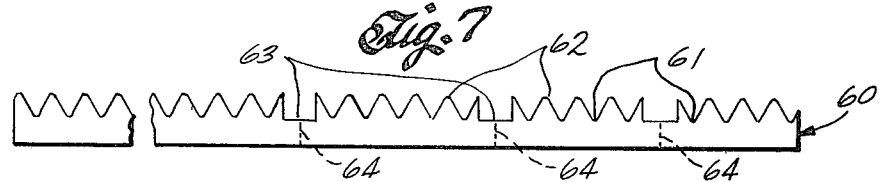
FIG. 7 illustrates a lateral cross-sectional view of a mold formed from the bundle of pins arranged as in FIG. 4.

Prismatic retroreflective sheeting which is not aluminized retroreflects only when instant rays exceed the critical angle between the prism facet and its air surfaces. Moisture or dirt on the prisms backside results in undesirable absorption and/or light scattering. To protect this optically sensitive backside prism surface, the prisms are hermetically sealed by bonding a backing material to raised grids projecting from the prism surface. Such raised grids on the sheeting containing a prismatic surface can be provided by forming a groove in the mold in which the prismatic sheeting is to be formed. In the method herein, such a groove can be formed to coincide with the edges of the individual pins. FIG. 7 schematically illustrates a lateral cross-sectional view of a mold 60 produced from an inscribed bundle of pins. The indentations 61 correspond to the trigonal pyramids of the pins and the projections 62 correspond to the valleys between such trigonal pyramids. The grooves 63 are cut into the mold 60 to coincide with the edges of the individual pins within a bundle. The dashed lines 64 in FIG. 7 illustrate the location of such pin edges. In this manner, the grid lines are coincident with the discontinuity in the prismatic surface created by the pins abutting edges. The grids are cut in a generally right angle orientation one to another to provide a grid pattern and a raised grid upon which a protective backing can be adhered. By providing a grid pattern coinciding with the edges of the pins a cellular structure can be formed in which the individual cells have a relatively small size. This small size isolates the individual cells from each other such that a rupture of the protective backing for an individual cell will not effect an adjacent cells ability to retroreflect light. A retroreflective prismatic sheeting made by this method is described in U.S. application Ser. No. 899,311, entitled DICED RETROREFLECTIVE SHEETING, filed on Apr. 24, 1978, and assigned to the same assignee as this application and is herein incorporated by this reference.

As can readily be understood by one skilled in the art, inscribing prisms on a planar surface formed by the top surfaces of a plurality of pins clamped tightly together provides many variables which can be changed and varied to influence the reflective properties of a retroreflective sheeting material made from such an inscribed pattern. For example, the angles of the inscribed pyramids can be changed to vary the angle at which incident light will be retroreflected. Also, the size of the prisms formed by inscribing the surface can be varied to change the angle at which light will be retroreflected. As described above, it can also be seen that by rotating the array of prisms, a different configuration will be obtained providing different retroreflective properties. All of these variables may be varied one at a time or simultaneously. For example, a bundle of pins can be inscribed forming pyramids having one angle while another bundle of pins can be inscribed having pyramids of a different angle. Also pins of one bundle can be inscribed having pyramids of one size while pyramids of a different size are inscribed on another bundle of pins. The pins can be separated from their respective bundles and then rebundled into a new bundle using pins from a variety of initially separate bundles. These pins can also be rotated to further vary the orientation of the pyramids upon the top surfaces of the pins in each bundle.

What is claimed is:

1. A method for forming a mold for making retroreflective sheeting comprising the steps of:
    a. forming a bundle of pins by clamping said pins together along their longitudinal axes, said pins each having a top surface, and the combined top surfaces of the pins providing a substantially planar surface;
    b. inscribing on said planar surface a continuous pattern of cube-corner trigonal pyramids;
    c. releasing the bundle of pins for allowing rotation of the pins;
    d. rotating the individual pins about their longitudinal axes for disorienting the continuous pattern of cube-corner trigonal pyramids;
    e. forming a new bundle of pins by clamping the rotated pins together along their longitudinal axes; and
    f. forming a mold for making retroreflective sheeting from the disoriented pattern of cube-corner trigonal pyramids on the new bundle of pins.

2. A method as recited in claim 1 wherein said pins have a square cross-sectional area and the pins are rotated at 90°, 180° and 270° from one another.

3. A method as recited in claim 1 wherein the pins have a square cross-sectional area, the square having sides from about 0.1 to about 0.25 inch.

4. A method as recited in claim 1 wherein the cube-corner trigonal pyramids inscribed upon said planar surface have bases from about 0.003 to about 0.015 inch on a side.

5. A method as recited in claim 1 further comprising the step of cutting a grid of grooves into the mold formed from the new bundle of pins, said grooves coinciding with the edges of the individual pins.

6. A method for forming a mold for making retroreflective sheeting comprising the steps of:
    a. forming a plurality of bundles of pins by clamping pins together along their longitudinal axes, said pins each having a top surface, such combined top surfaces in a bundle of pins providing a substantially planar surface for said bundle of pins;

b. inscribing on the planar surface of each bundle of pins a continuous pattern of cube-corner trigonal pyramids;

c. releasing each bundle of pins for allowing removal and rotation of the pins;

d. interchanging the pins between the bundles forming a plurality of new bundles of pins having disoriented patterns of cube-corner trigonal pyramids;

e. forming a mold for making retroreflective sheeting from the disoriented pattern of cube-corner trigonal pyramids on at least one of the new bundles of pins.

7. A method as recited in claim 6 wherein the pins in each of the plurality of bundles has a square cross-sectional area, said square having sides from about 0.1 to about 0.25 inch.

8. A method as recited in claim 6 wherein the pins in each of the plurality of bundles has a triangular cross-sectional area.

9. A method as recited in claim 6 wherein the pins in each of the plurality of bundles has a hexagonal cross-sectional area.

10. A method as recited in claim 6 wherein a new bundle is formed from pins having a square cross-sectional area being interchanged with pins having a triangular cross-sectional area.

11. A method as recited in claim 6 further comprising the step of cutting a grid of grooves into the mold formed from the new bundles of pins, said grooves coinciding with the edges of the individual pins.

12. A method as recited in claim 6 wherein each bundle of pins has a different size cube-corner trigonal pyramid inscribed thereon, such cube-corner pyramids having bases being from about 0.003 to about 0.015 inch on a side.

13. A method for forming retroreflective sheeting having a plurality of retroreflective cube-corner trigonal prisms distributed over one of its surfaces, the prisms disposed in a planar array having a plurality of zones of prisms having differing angular orientation, comprising the steps of:

a. forming at least one bundle of pins by clamping pins together along their longitudinal axes, said pins each having a top surface, such top surfaces combining to form a substantially planar surface on the bundle of pins;

b. inscribing on said planar surface a continuous pattern of cube-corner trigonal pyramids;

c. releasing the bundle of pins for allowing removal and rotation of the pins;

d. rotating the pins within the bundle about their longitudinal axes for providing differing angular orientation of the pyramid pattern;

e. rebundling the pins by reclamping the rotated pins together;

f. forming at least one mold from the disoriented pattern of cube-corner trigonal pyramids on the bundle of pins;

g. forming from said mold retroreflective sheeting having a plurality of retroreflective cube-corner trigonal prisms disposed in a planar array having a plurality of zones of prisms having differing angular orientations.

14. A method as recited in claim 13 wherein said pins have a square cross-sectional area and the pins are rotated at 90°, 180° and 270° from one another.

15. A method as recited in claim 13 wherein the pins have a square cross-sectional area, the square having sides from about 0.1 to about 0.25 inch.

16. A method as recited in claim 13 wherein the cube-corner trigonal pyramids inscribed upon said planar surface have bases from about 0.003 to about 0.015 inch on a side.

17. A method as recited in claim 13 further comprising the step of cutting a grid of grooves into the mold formed from the new bundle of pins, said grooves coinciding with the edges of the individual pins.

18. A method as recited in claim 13 wherein more than one bundle of pins is formed and each inscribed with a continuous pattern of cube-corner trigonal pyramids and further comprising the step of interchanging the pins from one bundle with the pins from a different bundle.

* * * * *